US012044188B2

(12) United States Patent
Alberer et al.

(10) Patent No.: US 12,044,188 B2
(45) Date of Patent: Jul. 23, 2024

(54) LEAK DIAGNOSIS FOR AN INTAKE SYSTEM

(71) Applicant: Bayerische Motoren Werke Aktiengesellschaft, Munich (DE)

(72) Inventors: Daniel Alberer, Sankt Florian (AT); Andreas Kerschbaummayr, Garsten (AT); Andreas Leyrer, Steyregg (AT); Bernhard Ramsebner, Ried im Traunkreis (AT); Martin Ranzmaier, Wilhering (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/274,243

(22) PCT Filed: Jan. 13, 2022

(86) PCT No.: PCT/EP2022/050599
§ 371 (c)(1),
(2) Date: Jul. 26, 2023

(87) PCT Pub. No.: WO2022/174995
PCT Pub. Date: Aug. 25, 2022

(65) Prior Publication Data
US 2024/0077043 A1 Mar. 7, 2024

(30) Foreign Application Priority Data
Feb. 18, 2021 (DE) ..................... 10 2021 103 794.8

(51) Int. Cl.
*F02D 41/18* (2006.01)
*F02D 23/00* (2006.01)
*F02D 41/22* (2006.01)

(52) U.S. Cl.
CPC ............. *F02D 41/18* (2013.01); *F02D 23/00* (2013.01); *F02D 41/22* (2013.01)

(58) Field of Classification Search
CPC ........... F02D 41/18; F02D 23/00; F02D 41/22
See application file for complete search history.

(56) References Cited

U.S. PATENT DOCUMENTS

2003/0209236 A1* 11/2003 Kirschke ................. F02D 41/18 123/690
2006/0011178 A1* 1/2006 Wild ................... F02D 13/0219 123/568.16

(Continued)

FOREIGN PATENT DOCUMENTS

DE 198 40 010 A1 3/1999
DE 19840010 A1 * 3/1999 .............. F02B 77/08

(Continued)

OTHER PUBLICATIONS

Nyberg, M.: "Model-Based Diagnosis of an Automotive Engine Using Several Types of Fault Models", IEEE Transactions on Control Systems Technology, IEEE Service Center, New York, NY, US, Sep. 1, 2002 (Sep. 1, 2002), pp. 679-689, vol. 10, No. 5, XP011071723, ISSN: 1 063-6536 (11 pages).

(Continued)

*Primary Examiner* — Sizo B Vilakazi
(74) *Attorney, Agent, or Firm* — Crowell & Moring LLP

(57) ABSTRACT

A vehicle drive has an internal combustion engine, an air conduit system, an exhaust system and a diagnostic unit for identifying a leak in the air conduit system of the internal combustion engine. The diagnostic unit is designed to carry out a method for diagnosing a leak in an internal combustion engine, including by determining mass flows in the air conduit system, and identifying a leakage mass flow.

9 Claims, 2 Drawing Sheets

(56) References Cited

U.S. PATENT DOCUMENTS

| | | | | |
|---|---|---|---|---|
| 2010/0023243 | A1* | 1/2010 | Heinkele | F02D 41/222 123/184.56 |
| 2010/0236218 | A1* | 9/2010 | De Tricaud | F02D 11/107 60/273 |
| 2011/0098876 | A1* | 4/2011 | Burkhardt | F02D 41/2464 701/31.4 |
| 2011/0282598 | A1* | 11/2011 | Ungermann | F02D 41/0002 702/51 |
| 2019/0226368 | A1* | 7/2019 | Hofmann | F02D 41/22 |

FOREIGN PATENT DOCUMENTS

| | | | | |
|---|---|---|---|---|
| DE | 100 28 878 | A1 | 12/2001 | |
| DE | 10 2011 086 361 | A1 | 5/2013 | |
| DE | 10 2018 201 680 | A1 | 8/2019 | |
| FR | 2 963 424 | A1 | 2/2012 | |
| FR | 2963424 | A1 * | 2/2012 | F02D 41/0007 |

OTHER PUBLICATIONS

International Search Report (PCT/ISA/210) issued in PCT Application No. PCT/EP2022/050599 dated Apr. 26, 2022 with English translation (5 pages).

German-language Written Opinion (PCT/ISA/237) issued in PCT Application No. PCT/EP2022/050599 dated Apr. 26, 2022 (6 pages).

German-language Office Action issued in German Application No. 10 2021 103 794.8 dated Dec. 12, 2021 (3 pages).

German-language Search Report issued in German Application No. 10 221 103 794.8 dated Sep. 24, 2021 with partial English translation (11 pages).

* cited by examiner

LEAK DIAGNOSIS FOR AN INTAKE SYSTEM

BACKGROUND AND SUMMARY

The invention relates to a method for diagnosing a leakage of an intake system of an internal combustion engine, and to a diagnostic unit for carrying out such a method, and to a vehicle drive with an internal combustion engine, an intake system, an exhaust system and such a diagnostic unit.

During regular operation of known vehicle drives with an internal combustion engine, an intake system and an exhaust system, leakage situations in the fresh air conduit and/or the intake system sporadically occur, the position of which leakages cannot be precisely delimited within the fresh air conduit and/or the intake system.

Known solutions make available a multiplicity of general diagnoses in the air system. However, these permit only the diagnosis of the presence of a leakage at some position in the air conduit. For example, in US 2010/236218 A, this is made possible taking lambda values into consideration.

Against this background, it is an object of the invention to improve a leakage diagnosis in the intake system of an internal combustion engine of a motor vehicle.

This object is achieved by a method, a diagnostic unit, and a vehicle drive, in accordance with the independent claims. The dependent claims relate to advantageous developments of the invention.

According to one aspect, a method for diagnosing a leak in an air conduit, in particular of an intake system, of an internal combustion engine, in particular of a motor vehicle, is disclosed. The method comprises at least one of the following method steps:

(i) Determining the mass flows, in particular all provided regularly, of the air conduit, in particular of an air manifold of the intake system. That is to say, in particular all mass flows which flow into and out of the air conduit, in particular into and out of the intake system, during regular operation of the internal combustion engine are determined. A regular mass flow should therefore be understood here as meaning in particular—as distinct from a leakage mass flow which is irregular or is not provided—any mass flow in the air conduit that can be provided in regular operation of the vehicle drive for driving the vehicle.

(ii) Establishing a mass flow balance on the basis of the determined mass flows. The establishing of the mass flow balance is described in detail inter alia with respect to the exemplary embodiments.

(iii) Ascertaining a leakage mass flow on the basis of the established mass flow balance. The ascertaining of the leakage mass flow is described in detail inter alia with respect to the exemplary embodiments.

An ascertaining of the leakage mass flow on the basis of the established mass flow balance permits a precisely targeted taking of measures to compensate for the leakage mass flow, even during regular operation of the internal combustion engine. Compensating for the leakage mass flow can be understood as meaning measures for compensating for undesirable effects of the leakage mass flow and/or measures for eliminating the leakage mass flow.

A leakage can be understood here as meaning in particular a hole (i.e. a leak) in a component of the air conduit, in particular of the intake system.

The air conduit has in particular a charge air conduit, a charge air cooler and/or an intake system with interfaces with the inlet valves. In particular, a compressor of an exhaust gas turbocharger and/or a throttle valve for the desired metering of the fresh air as the latter is being admitted to the air manifold is/are arranged in the fresh air conduit.

Ascertaining a leakage mass flow should be understood here as meaning in particular: identifying (in particular the presence of) a leakage mass flow. In particular, this should additionally be understood as meaning a more detailed description of the leakage mass flow depending on position, size and/or flow direction, in particular in the sense of distinguishing it from other possible positions, sizes and/or flow directions of a leakage mass flow.

According to a further aspect, a diagnostic unit is disclosed which is designed in particular as system components of an engine controller of the vehicle drive. The diagnostic unit serves for identifying a leakage of an air conduit, in particular of an intake system, of an internal combustion engine, in particular of a motor vehicle. The diagnostic unit is designed to carry out a method according to one embodiment of the invention.

According to a further aspect, a vehicle drive is disclosed, having an intake system, an internal combustion engine and an exhaust system. The vehicle drive has a diagnostic unit according to one embodiment of the invention.

According to one embodiment, the vehicle drive has an exhaust gas recirculation line (EGR line) which is designed to connect the exhaust system to the intake system in a manner conducting exhaust gas.

For vehicle drives in which exhaust gas recirculation (EGR) is provided, the invention and the associated possibility of leakage diagnosis during the regular operation of the internal combustion engine are particularly helpful. This is because the entrained exhaust gas can reach significantly higher temperatures than the compressed, but supplied cool, fresh air, even if the recirculated exhaust gases have passed through an EGR cooler.

The intake system—into which the EGR line opens—is frequently formed by plastics material, and therefore, in the event of very unfavorable operating conditions, for example with high ambient temperatures and operating points of the internal combustion engine with high EGR mass flows, leakages can occur, for example due to the recycled exhaust gases being admitted at a high temperature into a plastics air manifold, in particular if there is already a certain accumulation of soot on the most heavily loaded wall portions.

The invention is based inter alia on the observation that the known leakage diagnostic methods do not permit a more specific error pattern of a leakage in the intake system, in particular not with precision with regard to other leakage sites. In addition, the known leakage diagnostic methods do not permit a reliable delimitation of the error during the regular driving operation.

The invention is also based inter alia on the observation that such a differentiated diagnosis can serve as a basis for targeted fallback reactions to the leakage—even during the driving operation.

The invention is now based inter alia on the concept of ascertaining, continuously according to one embodiment, a leakage mass flow with the aid of the regular mass flows at the intake system. In the event of a leakage, and with corresponding mass flow balancing, a substantial leakage mass flow can be ascertained.

The invention can be used in particular, but not exclusively, in a supercharged combustion engine which has a throttle valve or another suitable throttle member at an inlet of the fresh air conduit into the intake system, and can be equipped with exhaust gas recirculation (EGR).

In the intake system there are inflowing and outflowing (fluid) mass flows, the sum total of which is compensated for in the ideal case (=that is to say without balancing errors and/or an actual leakage mass flow):

The mass flow via the throttle valve and optionally the mass flow via the EGR path are inflowing. The mass flow into the combustion chambers of the cylinders of the internal combustion engine is outflowing.

Added to this in the event of a leakage occurring is the leakage mass flow which, depending on the ratio of the gas pressures between the interior of the intake system and an ambient pressure, is an inflowing or an outflowing mass flow.

The invention is correspondingly based, inter alia, on the concept of taking into consideration the pressure in the intake system in relation to the ambient air pressure.

In this case, according to one embodiment, a differentiation is made between operating regions in which the charging pressure is higher than the ambient pressure and those in which the charging pressure is lower than the ambient pressure.

In the event of positive pressure in the intake system, the leakage mass flow is by definition an outflowing mass flow from the intake system. In the event of negative pressure in the intake system, the leakage mass flow is an inflowing mass flow.

Only a leakage which originates in the intake system (i.e. the hole which causes the leakage) can be described by this consideration (in particular a coupled consideration of the leakage ratios for positive pressure and negative pressure).

Leakages at other locations do not correlate with assumptions to be made, according to one embodiment, as to how the mass flow is coupled to the charging pressure. These assumptions are described inter alia with respect to the exemplary embodiments.

In comparison to the prevailing typical errors of the air system sensors and the resulting lack of precision of the known leakage diagnostic methods, the required precision is produced by the invention to differentiate between typical system tolerances and sensor errors and an error pattern of a leakage in the intake system.

The balanced leakage mass flow is dependent on the respective gas state (pressure, temperature) in the intake system. The operating point dependency can be eliminated by calculating back to a characteristic variable. For this purpose, according to one embodiment, the leakage can be calculated back with the aid of a flow equation (throttle equation) to a throttle cross section or throttle diameter.

A reliable diagnosis of a leakage in the intake system is produced, according to one embodiment, if the result of the leakage cross section is of a similar order of magnitude for the positive pressure range and negative pressure range such that both results correlate in the same manner to the assumptions that have been made. If a valid calculation result is present in the positive pressure range and in the negative pressure range, very small leakages are already detected in a targeted manner in the region of the intake system and of the EGR system.

Correspondingly, according to one embodiment, dedicated fallback reactions can be introduced (compensation for and/or elimination of the leakage mass flow during regular operation or a garage visit) such that reliable and environmentally friendly operation of the vehicle continues to be ensured.

If, despite a fallback reaction which has been undertaken, the leakage increases further, this is identified, according to one embodiment, by the diagnosis and a more precise fallback reaction introduced. With original fallback reactions in the regular driving operation, then, for example, continued travel prior to a check in a garage may be prevented here.

According to one embodiment, the invention is used as diagnostic unit (i.e. diagnostic function) in the engine control unit.

According to one embodiment, the method additionally comprises the following method step: ascertaining a position and/or a size, in particular a diameter, of a leak depending on the ascertained leakage mass flow. As a result, it can be delimited more precisely which measure is required to which extent to compensate for the leakage mass flow during operation of the internal combustion engine.

According to one embodiment, the leakage mass flow is ascertained during regular operation of the internal combustion engine. This makes it possible to undertake measures to compensate for a leakage mass flow directly after the original occurrence thereof.

According to one embodiment, the method additionally comprises the following method steps:

- ascertaining a positive-pressure leakage mass flow, and a positive-pressure size characteristic value depending on the ascertained positive-pressure leakage mass flow, in particular with regard to a first operating state (for example a normal driving operation of the vehicle), and/or
- ascertaining a negative-pressure leakage mass flow, and a negative-pressure size characteristic value depending on the ascertained negative-pressure leakage mass flow, in particular with regard to a second operating state (for example a regeneration operation of a storage catalytic converter or of a particulate filter),
- determining a position of the leak depending on a ratio of the ascertained positive-pressure size characteristic value to the ascertained negative-pressure size characteristic value.

The ratio of the ascertained positive-pressure size characteristic value to the ascertained negative-pressure size characteristic value can be used as an indicator of a position of the leak. In particular, a diameter or an area of the leakage can be used as the size characteristic value of the leak.

For example, it should be assumed that the leak is present in that region of the intake system for which the mass flow balancing has been established if the two size characteristic values when sign-corrected are approximately identical in size, i.e. are in a ratio of approx. 1 to each other. By contrast, for example, it should be assumed that the leak is present in a different region of the intake system if this ratio differs significantly from 1.

However, the ratio of the positive-pressure size characteristic value to the negative-pressure size characteristic value can likewise be determined by means of a threshold value consideration which is oriented by way of a pre-ascertained threshold value for relevant leakages which, for example, defines from which leakage diameter or which leakage area the calculation results are first interpreted at all as a leak by means of the motor controller, and not as a measurement error, detection fusion or similar.

In particular, the intake system can be determined as the position of the leak (i.e. in particular downstream of the throttle valve) if the ascertained positive-pressure size characteristic value and the ascertained negative-pressure size characteristic value are greater than the threshold value.

In particular, the charging air conduit can be determined as the position of the leak if only one of the ascertained positive-pressure size characteristic value and the ascertained negative-pressure size characteristic value is greater than the threshold value.

According to one embodiment, a size, in particular a diameter, of the leak is determined depending on the ascertained leakage mass flow or flows. Also as a result, better delimitation of suitable measures to compensate for the leakage mass flow can be undertaken.

According to one embodiment, a fallback reaction to the leakage mass flow, in particular to compensate for or eliminate the leakage flow, is ascertained depending on the ascertained position, size and/or flow direction of the leakage mass flow. As a result, the internal combustion engine can optionally continue to be operated even with the leak which is present, in particular also with acceptable emissions.

According to one embodiment, the leakage mass flow is ascertained depending on an ambient pressure of the intake system. This permits a statement to be made regarding the size and/or the flow direction of the leakage mass flow.

According to one embodiment, the mass flows, in particular the regular mass flows in the intake system and the leakage mass flow, are determined depending on at least one pressure, in particular the air or the mixture or the exhaust gas in the intake system, and/or on an ambient pressure. Additionally or alternatively, the mass flows are determined depending on at least one temperature, in particular the air or the mixture or the exhaust gas in the intake system. Additionally or alternatively, the mass flows are determined depending on an interface cross section, in particular an inlet or outlet cross section into or out of the intake system, in particular into or out of the air manifold.

As a result, the mass flow balancing can be undertaken via the established relationships of the nozzle flow of fluids, in particular the throttle equation.

Further advantages and possibilities of use of the invention emerge from the description below in conjunction with the figures.

DETAILED DESCRIPTION OF THE DRAWINGS

Figure 1:
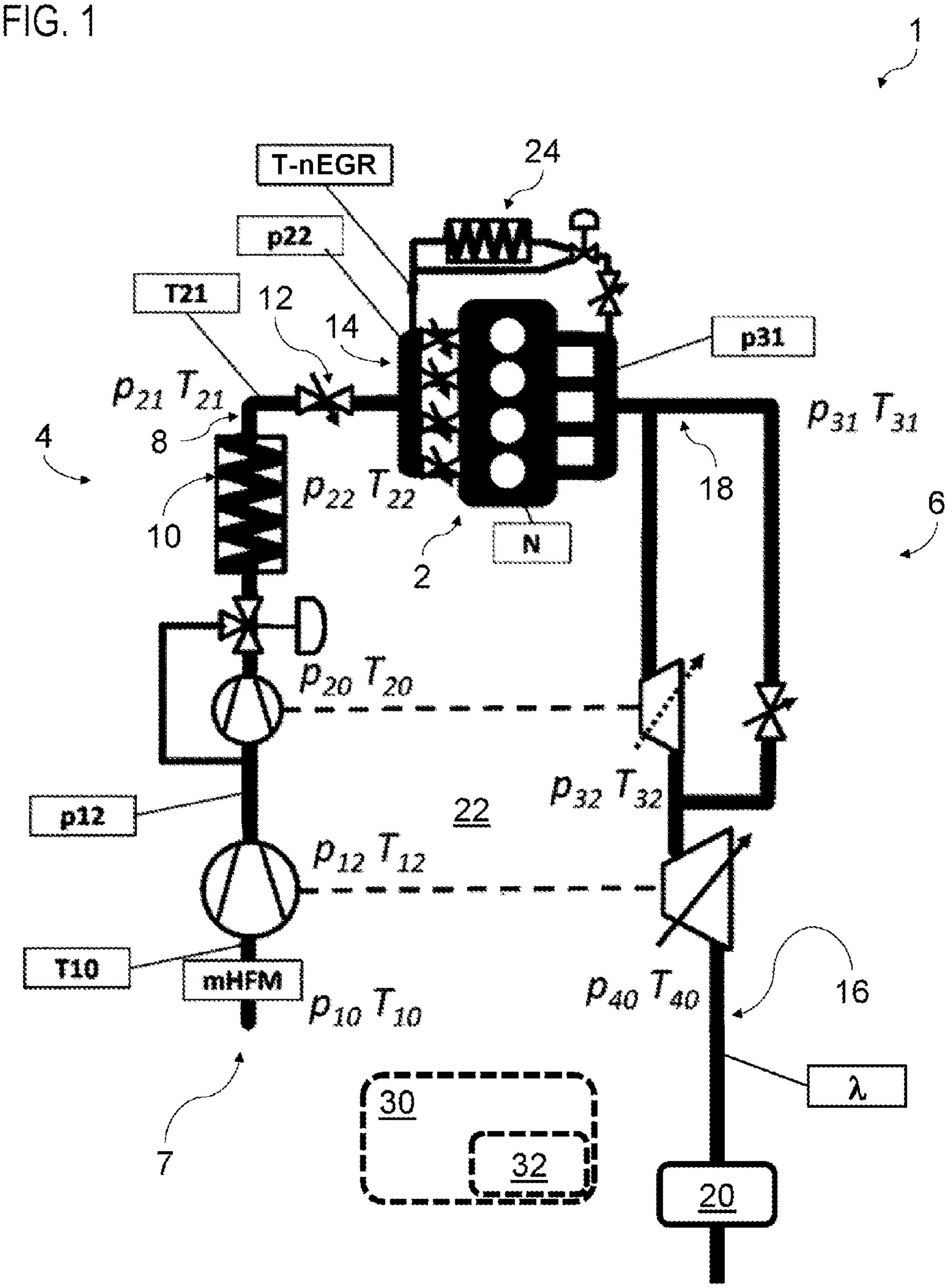
FIG. 1 shows a vehicle drive with a diagnostic unit according to one exemplary embodiment of the invention.

FIG. 1 shows a vehicle drive 1 having an internal combustion engine 2. The internal combustion engine 2 is designed in the exemplary embodiment as a four-cylinder diesel engine. The internal combustion engine 2 is connected to an air conduit 4 for supply with oxygen, and to an exhaust system 6 for conducting and optionally purifying the exhaust gases.

The air conduit 4 has a charge air conduit 8, a charge air cooler 10, a throttle valve 12 and an intake system 14.

Along an exhaust gas conduit 16, the exhaust system 6 has an exhaust gas manifold 18 and an exhaust gas aftertreatment arrangement 20 which has at least one oxidation catalytic converter, but in particular further aftertreatment devices such as at least one particulate filter and/or at least one SCR catalytic converter.

To increase the power of the internal combustion engine 2, a two-stage exhaust gas turbocharger 22 is arranged in the charge air conduit 8 of the air conduit 4 and in the exhaust gas conduit 16 of the exhaust system 6, wherein the compressors of the exhaust gas turbocharger 22 are arranged in the charge air conduit 8 and the turbines of the exhaust gas turbocharger 22 are arranged in the exhaust gas conduit 16. In the exemplary embodiment, an engine topology with two series-arranged turbochargers is illustrated. It is self-evident per se that the invention and also the exemplary embodiment described here can also be used in different engine topologies, for example with a single turbocharger.

The high-pressure compressor and the high-pressure turbine of the exhaust gas turbocharger 22 are each designed in the exemplary embodiment such that they can be circumvented by way of a switchable bypass.

The air conduit 4 and the exhaust system 6 are connectable by means of a switchable high-pressure EGR line 24 such that hot exhaust gas can be conducted from the exhaust gas manifold 18 into the air manifold 14 and mixed there with the fresh air. In the exemplary embodiment, the exhaust gases in the EGR line 24 can be switchably guided through an EGR cooler and/or past same.

A hot film air mass meter HFM for measuring an air mass flow mHFM, and a temperature sensor for measuring a fresh air temperature T10, are arranged at a fresh air inlet 7 of the charge air conduit 8.

A pressure sensor for measuring a compressor pressure p12 in the charge air conduit 8 is arranged between the two compressors.

A temperature sensor for measuring a pre-throttle temperature T21 in the fresh air conduit is arranged between the charge air cooler 10 and the throttle valve 12.

A pressure sensor for measuring a charge pressure p22 is arranged in the air manifold 14.

A temperature sensor for measuring an EGR mixture temperature T-nEGR at the inlet into the air manifold 14 is arranged in the EGR line 24.

A pressure sensor for measuring a pre-turbine pressure p31 is arranged in the exhaust gas manifold 18.

A lambda probe for measuring a mixture composition of the exhaust gases before they enter the exhaust gas aftertreatment arrangement 20 is arranged between the low-pressure turbine of the exhaust gas turbocharger 22 and the exhaust gas aftertreatment arrangement 20.

The vehicle drive 1 furthermore has an engine controller 30 that is configured to actuate the vehicle drive 1, and all components thereof, in accordance with the operating requirements of the motor vehicle. For optimum actuation of the vehicle drive and of the components thereof, the engine controller 30 is also configured to take into consideration measured values from all of the abovementioned sensors and to access conventional operation models, lookup tables, etc., optionally using the detected and/or processed sensor values.

The engine controller 30 has a diagnostic unit 32 that is configured to carry out an exemplary method for diagnosing a leakage 40 of the air conduit 4 of the vehicle drive 1, and thus to ascertain a leakage mass flow. The engine controller may be processor, software and/or hardware based.

The execution of the exemplary method together with a number of variants will be described in detail below on the basis of explanations relating to the illustration of FIG. 2.

Figure 2:
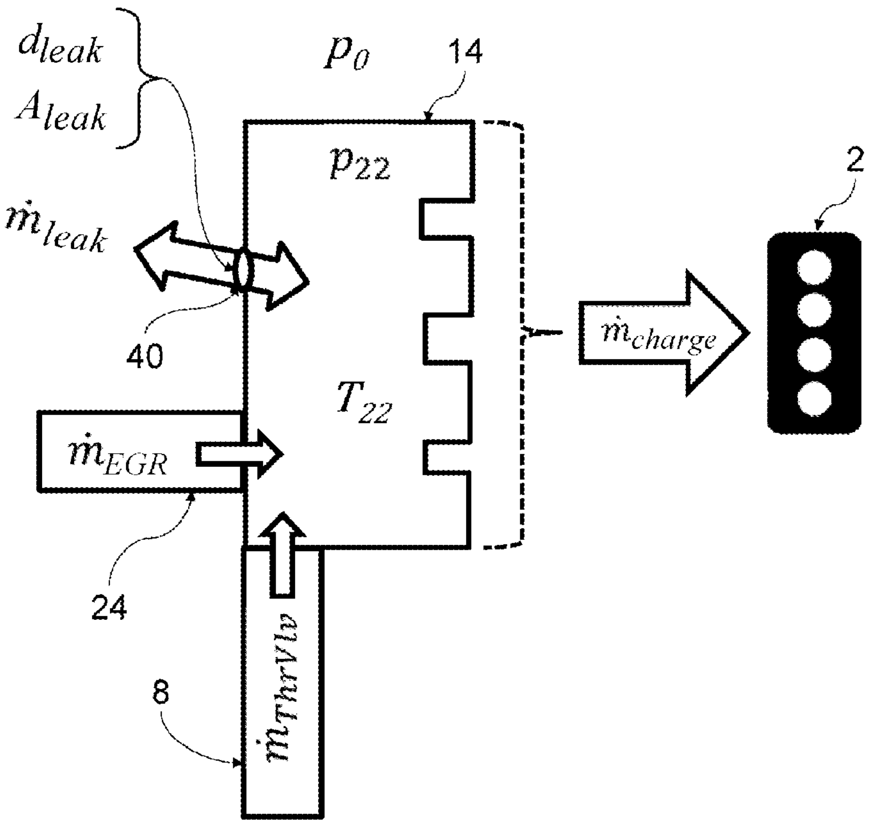
FIG. 2 shows mass flows at an intake system of an air conduit of the vehicle drive from FIG. 1, with consideration of which a method according to an exemplary embodiment of the invention can be carried out.

FIG. 2 shows schematically the regular mass flows at the air manifold 14: a throttle mass flow $\dot{m}_{ThrVLv}$ and an EGR mass flow $\dot{m}_{EGR}$ into the air manifold, and a charge mass flow $\dot{m}_{charge}$ from the air manifold into the cylinders.

In addition, a possible leakage mass flow $\dot{m}_{leak}$ which is to be diagnosed or to be ascertained is indicated. The leakage mass flow $\dot{m}_{leak}$ is indicated without anticipation of the flow direction; both flow directions of a leakage mass flow $\dot{m}_{leak}$ are possible, depending on whether an ambient pressure $p_0$ is higher or lower than the charge pressure $p_{22}$—hence the illustration using the double arrow.

Using the temperature value $T_{22}$, which is additionally indicated in FIG. 2, in the air manifold 14 and with recourse to operating models and lookup tables stored in the engine controller 30 (optionally in conjunction with further measurement values of the above-described sensors), the diagnostic unit 32 is configured to carry out a method for diagnosing a leakage 40 of the air conduit 4 and here in particular of the air manifold 14.

For this purpose, first of all the regular mass flows (throttle mass flow $\dot{m}_{ThrVlv}$, EGR mass flow $\dot{m}_{EGR}$ and charge mass flow $\dot{m}_{charge}$) of the intake system 4 with respect to the air manifold 14 are determined.

Subsequently, a mass flow balance is established on the basis of the determined mass flows by means of the diagnostic unit 30. The mass flow balance of an optimally tight intake system is produced by:

$$\dot{m}_{charge}-\dot{m}_{ThrVlv}-\dot{m}_{EGR}=0$$

For an intake system which is not optimally tight, an initially unascertained leakage mass flow $\dot{m}_{leak}$ is produced, for the ascertaining of which on the basis of the established mass flow balance the following applies:

$$\dot{m}_{charge}-\dot{m}_{ThrVlv}-\dot{m}_{EGR}+\dot{m}_{leak}=0 \Leftrightarrow \dot{m}_{leak}=\dot{m}_{EGR}+\dot{m}_{ThrVLv}-\dot{m}_{charge} \quad (1)$$

where $p_{22}>0 \Rightarrow \dot{m}_{leak}>0$ and $p_{22}<0 \Rightarrow \dot{m}_{leak}<0$ In this way, during regular operation of the internal combustion engine, the leakage mass flow $\dot{m}_{leak}$ is ascertained on the basis of the established mass flow balance.

Via the general throttle equation of fluid flows $$\dot{m} = \frac{d^2 pi}{4} p_{before} \sqrt{\frac{2}{RT_{before}}} \Psi \quad (2)$$

a size, here a diameter $d_{leak}$ of a leak 40, can be ascertained depending on the ascertained leakage mass flow $\dot{m}_{leak}$.

The calculation of $d_{leak}$ is based on the fact that $d_{leak}$ is equal to zero in a leak-free intake system or is at least virtually precisely zero if relatively minor calculation errors are taken into consideration.

In the exemplary method, both a positive-pressure leakage mass flow is ascertained (i.e. in an operating range in which the charge pressure $p_{22}$ is greater than the ambient pressure $p_0$, for example in a normal driving mode) and a negative-pressure leakage mass flow is ascertained (i.e. in an operating range in which the charge pressure $p_{22}$ is lower than the ambient pressure $p_0$, for example in a regeneration operation of a storage catalytic converter or a particulate filter). Depending on the ascertained positive-pressure leakage mass flow, a positive-pressure size characteristic variable (here a positive-pressure leakage cross section) is ascertained. Depending on the ascertained negative-pressure leakage mass flow, a negative-pressure size characteristic variable (here a negative-pressure leakage cross section) is ascertained.

A position of the leak 40 is then determined depending on a ratio of the positive-pressure leakage cross section to the negative-pressure leakage cross section.

If the two leakage cross sections (as a size characteristic value for the leakage) when sign-corrected are approximately identical in size, i.e. in a ratio of approx. 1 to each other, it should be assumed that the leak 40 is present in that region of the air conduit 4 for which the mass flow balancing has been established, here in the air manifold 14. By contrast, it should be assumed that the leak 40 is present in a different region of the air conduit 4 if said ratio significantly differs from 1.

The ratio can also be determined indirectly, for example by both for the ascertained positive-pressure leakage cross section and for the ascertained negative-pressure leakage cross section a respective comparison being carried out with a pre-ascertained threshold value for a relevant leakage cross section.

It can optionally be taken into consideration here that relatively minor errors in the calculations of the regular mass flows by means of the engine controller 30 may lead to errors in the estimation of the leakage diameter $d_{leak}$. The estimated value for $A_{leak}$ can then be taken into consideration, for example, as follows:

Taking into consideration a mass flow error $$A_{eff}+A_{err}=(\dot{m}+\dot{m}_{err})*f(p,T)$$

and assuming that the area error for $p_{22}>0$ and $p_{22}<0$ behaves identically, the result is $$A_{pos}+A_{err}=(\dot{m}_{pos}+\dot{m}_{err,pos})*f(p,T) \text{ and}$$

$$A_{neg}+A_{err}=(\dot{m}_{neg}+\dot{m}_{err,neg})*f(p,T),$$

and thus a mean area $$A_{Avg} = \frac{A_{pos}+A_{err}+A_{neg}-A_{err}}{2} = \frac{A_{pos}+A_{neg}}{2},$$

and, for the leakage diameter $$\frac{d_{Avg}^2 pi}{4} = \frac{1}{2}\left(\frac{d_{pos}^2 pi}{4} + \frac{d_{neg}^2 pi}{4}\right)$$

a mean leakage diameter $$d_{Avg} = \sqrt{\frac{d_{pos}^2 + d_{neg}^2}{2}}.$$

To calculate a leakage area $A_{leak}$, equation 2 is used for the leakage mass flow $\dot{m}_{leak}$ in equation 1 for:

$$\dot{m}_{EGR} + \dot{m}_{ThrVlv} - \dot{m}_{charge} = A_{leak} p_{before} \sqrt{\frac{2}{RT_{before}}} \Psi \text{ where}$$

$$\Psi = \sqrt{\frac{\kappa}{\kappa-1}\left(\left(\frac{p_{after}}{p_{before}}\right)^{\frac{2}{\kappa}} - \left(\frac{p_{after}}{p_{before}}\right)^{\kappa+\frac{1}{\kappa}}\right)} \quad (3)$$

$$A_{leak} = \frac{d_{leak}^2 \pi}{4}$$

$R$ gas constant $\kappa$ isentropic exponent

For a positive-pressure operating point where p22>p0 (charge pressure is greater than ambient pressure), in equation 3 $p_{before}$ should be equated to the charge pressure $p_{22}$;

$p_{after}$ to the ambient pressure $p_0$. Both values are present in the engine controller 30 and therefore in the diagnostic unit 32 as sensor measurement values. In addition, $T_{before}$ should be equated to the temperature $T_{22}$ in the intake system 14. $T_{22}$ can be gathered by the engine controller 30 from an operating model and/or a lookup table. The EGR mass flow can be gathered from an operating model taking into consideration the measurement values of the pressure sensors which are present. The throttle valve mass flow can be gathered, with dynamic adaptation, from the values of the air mass sensor HFM. The mass flow into the combustion chambers can be gathered from an operating model taking into consideration measured pressure values and a measured engine rotational speed N. The required calculations are each undertaken by the engine controller 30 and/or the diagnostic unit 32.

For a negative-pressure operating point where $p_{22}<p_0$ (charge pressure is lower than ambient pressure), in equation 3 $p_{after}$ should be equated to the charge pressure $p_{22}$; $p_{before}$ to the ambient pressure $p_0$. Both values are present in the engine controller 30 and therefore in the diagnostic unit 32 as sensor measurement values. In addition, approximately for $T_{before}$, a temperature value from the surroundings can be used, or, for example, a weighted combination—in particular by means of a prefilled characteristic map—of ambient temperature and engine temperature, which has the aim of sufficiently precisely depicting a real temperature depending on the operating point. $T_{22}$ can be gathered by the engine controller 30 from an operating model and/or a lookup table. The EGR mass flow can be gathered from an operating model taking into consideration the measurement values of the pressure sensors which are present. The throttle valve mass flow can be gathered, with dynamic adaptation, from the values of the air mass sensor HFM. The mass flow into the combustion chambers can be gathered from an operating model taking into consideration measured pressure values and a measured engine rotational speed N. The required calculations are respectively undertaken by the engine controller 30 and/or the diagnostic unit 32.

Both for positive-pressure operating points and for negative-pressure operating points the following applies: if, for $A_{leak}$, a value only differing slightly from zero is produced, an at least substantially tight air conduit 4 should nevertheless be assumed. In these cases, the value is normally not equal to zero only because of model and/or sensor tolerances. Determined values for $A_{leak}$ of, depending on the application, up to approx. 10 to 15 $mm^2$ therefore result in a diagnosis of "tight system". In general, determined values for $A_{leak}$ that are in proportion substantially smaller than the leakages to be anticipated in the event of an error therefore result in a diagnosis of "tight system". The limit for an assumed precision of the diagnosis depends in particular on the system tolerances which are present.

If higher values result for $A_{leak}$, a leakage 40 should be assumed within the meaning of the pre-ascertained threshold value which has already been mentioned (optionally analogously estimated for a leakage diameter).

If the determined values for $A_{leak}$ correspond to a certain extent for a positive-pressure operating point and for a negative-pressure operating point, i.e. said values are of a size ratio of in particular between 0.75 and 1.25, for example between 0.9 and 1.1 to one another, the diagnosis carried out also permits the following statements:

The diagnosed leak 40 is located at that part of the air conduit 4 for which the mass flow balance has been established, here at the air manifold 14.

It should be assumed that the leak 40 arranged there has a size which corresponds at least substantially to the mean value of the two determined values for $A_{leak}$.

In accordance with the position and the size of the leak 40 diagnosed in such a manner, suitable measures can be undertaken (i.e. fallback reactions) to compensate for and/or eliminate the leak 40—even during the regular driving operation and/or at a possibly necessary garage visit.

LIST OF REFERENCE SIGNS

1 Vehicle drive
2 Internal combustion engine
4 Air conduit
6 Exhaust system
8 Charge air conduit
10 Charge air cooler
12 Throttle valve
14 Intake system
16 Exhaust gas conduit
20 Exhaust gas aftertreatment arrangement
22 Exhaust gas turbocharger
24 High-pressure EGR line
30 Engine controller
32 Diagnostic unit
40 Leak or leakage
$A_{leak}$ Leakage area
$d_{leak}$ Diameter of the leakage
HFM Hot film air mass meter
$\dot{m}_{EGR}$ EGR mass flow
$\dot{m}_{charge}$ Charge mass flow
$\dot{m}_{leak}$ Leakage mass flow
$\dot{m}_{ThrVLv}$ Throttle mass flow
$p_0$ Ambient pressure
$p_{12}$ Compressor pressure
$p_{22}$ Charge pressure
$p_{31}$ Pre-turbine pressure
$T_{10}$ Fresh air temperature
$T_{21}$ Pre-throttle temperature
$T_{22}$ Air manifold temperature
T-nEGR EGR mixture temperature
$\lambda$ Fuel/air ratio

The invention claimed is:

1. A method for diagnosing a leakage of an internal combustion engine, comprising:

determining regular mass flows ($\dot{m}_{EGR}$, $\dot{m}_{charge}$, $\dot{m}_{ThrVlv}$) of an air conduit of the internal combustion engine;

establishing a mass flow balance on the basis of the determined regular mass flows;

ascertaining a leakage mass flow ($\dot{m}_{leak}$) on the basis of the established mass flow balance;

ascertaining a position and/or a size ($A_{leak}$, $d_{leak}$) of a leak depending on the ascertained leakage mass flow;

(i) ascertaining a positive-pressure leakage mass flow ($\dot{m}_{leak}$) and a positive-pressure size characteristic value ($A_{leak,pos}$, $d_{leak,pos}$) depending on an ascertained positive-pressure leakage mass flow; and/or (ii) ascertaining a negative-pressure leakage mass flow ($-\dot{m}_{leak}$) and a negative-pressure size characteristic value ($A_{leak,neg}$, $d_{leak,neg}$) depending on an ascertained negative-pressure leakage mass flow; and determining a position of the leak depending on a ratio of the ascertained positive-pressure size characteristic value to the ascertained negative-pressure size characteristic value.

2. The method according to claim 1, wherein the leakage mass flow is ascertained during regular operation of the internal combustion engine.

3. The method according to claim 1, wherein the size of the leak is determined depending on the ascertained leakage mass flow or flows.

4. The method according to claim 1, wherein a fallback reaction to the leakage mass flow is ascertained depending on the ascertained position, size and/or a flow direction of the leakage mass flow.

5. The method according to claim 1, wherein the leakage mass flow is ascertained depending on an ambient pressure ($p_0$) of the intake system.

6. The method according to claim 1, wherein the regular, mass flows are determined depending on at least one pressure ($p_0$, $p_{12}$, $p_{22}$, $p_{31}$), at least one temperature ($T_{10}$, $T_{21}$, $T_{22}$), and/or an interface cross section.

7. An apparatus, comprising:

a diagnostic unit for identifying a leakage of an air conduit of an internal combustion engine, wherein the diagnostic unit is operatively configured to:

determine regular mass flows ($\dot{m}_{EGR}$, $\dot{m}_{charge}$, $\dot{m}_{ThrVlv}$) of an air conduit of the internal combustion engine;

establish a mass flow balance on the basis of the determined regular mass flows;

ascertain a leakage mass flow ($\dot{m}_{leak}$) on the basis of the established mass flow balance;

ascertain a position and/or a size ($A_{leak}$, $d_{leak}$) of a leak depending on the ascertained leakage mass flow;

(i) ascertain a positive-pressure leakage mass flow ($\dot{m}_{leak}$) and a positive-pressure size characteristic value ($A_{leak,pos}$, $d_{leak,pos}$) depending on an ascertained positive-pressure leakage mass flow; and/or (ii) ascertain a negative-pressure leakage mass flow ($-\dot{m}_{leak}$) and a negative-pressure size characteristic value ($A_{leak,neg}$, $d_{leak,neg}$) depending on an ascertained negative-pressure leakage mass flow; and determine a position of the leak depending on a ratio of the ascertained positive-pressure size characteristic value to the ascertained negative-pressure size characteristic value.

8. A vehicle drive, comprising:

an internal combustion engine;

an air conduit;

an exhaust system, and a diagnostic unit according to claim 7.

9. The vehicle drive according to claim 8, further comprising:

an exhaust gas recirculation line which connects the exhaust system to an intake system in a manner conducting exhaust gas.

* * * * *